(12) United States Patent
Sebata et al.

(10) Patent No.: US 7,152,725 B2
(45) Date of Patent: Dec. 26, 2006

(54) CONTROL SYSTEM FOR TRANSMISSION

(75) Inventors: Kazuhito Sebata, Atsugi (JP); Masahiko Hayashi, Fujisawa (JP)

(73) Assignee: Isuzu Motors Limited, Tokyo (JP)

(*) Notice: Subject to any disclaimer, the term of this patent is extended or adjusted under 35 U.S.C. 154(b) by 98 days.

(21) Appl. No.: 10/926,870

(22) Filed: Aug. 26, 2004

(65) Prior Publication Data
US 2005/0045447 A1    Mar. 3, 2005

(30) Foreign Application Priority Data
Aug. 28, 2003  (JP)  ............................. 2003-304420

(51) Int. Cl.
F16H 59/54      (2006.01)
F16H 61/16      (2006.01)

(52) U.S. Cl. ..................... 192/220.2; 701/66
(58) Field of Classification Search ............... None
See application file for complete search history.

(56) References Cited

U.S. PATENT DOCUMENTS

| | | | |
|---|---|---|---|
| 4,930,609 A | 6/1990 | Bois et al. ................ 192/4 |
| 4,991,454 A * | 2/1991 | Bulgrien ................ 74/335 |
| 5,611,245 A * | 3/1997 | McKee ................ 74/336 R |
| 5,784,917 A | 7/1998 | Hayward ................ 192/4 |
| 5,845,224 A * | 12/1998 | McKee ................ 701/51 |
| 6,736,756 B1 * | 5/2004 | Kwon ................ 477/98 |
| 2002/0029951 A1 * | 3/2002 | Beattie et al. ........ 192/220.4 |
| 2002/0162699 A1 * | 11/2002 | Shiomi et al. ............ 180/315 |
| 2002/0166400 A1 * | 11/2002 | Syamoto et al. ........ 477/96 |
| 2004/0053743 A1 * | 3/2004 | Tsuzuki et al. ............ 477/97 |
| 2004/0259685 A1 * | 12/2004 | Inoue et al. ............ 477/118 |

FOREIGN PATENT DOCUMENTS

| | | |
|---|---|---|
| DE | 100 43 412 A1 | 4/2001 |
| DE | 100 59 276 A1 | 6/2001 |
| EP | 1 155 899 A2 | 11/2001 |
| GB | 2 355 502 A | 4/2001 |
| JP | 60-008555 | 1/1985 |

OTHER PUBLICATIONS

Copy of European Search Report for SN EP 04 02 0293 dated Apr. 3, 2006, mailed Apr. 11, 2006.

* cited by examiner

Primary Examiner—Rodney H. Bonck
(74) Attorney, Agent, or Firm—McCormick, Paulding & Huber LLP

(57) ABSTRACT

A control system for a transmission (T/M) including a select lever (r) operable to shift from a neutral position (N) to a running position (D, R) and vice versa, and a control part (c) to control a changing gear operation of the transmission in accordance with the position of the select lever. The control part includes a changing gear limitation system (1), and when the select lever is shifted from the neutral position to the running position, the changing gear limitation system permits a gear-in operation of the transmission if a stationary time (T) during when the select lever is in the neutral position is equal to or less than a predetermined time, and holds the transmission in the neutral state if the stationary time exceeds the predetermined time. By this constitution, the direction of the driving force can be quickly reversed.

19 Claims, 4 Drawing Sheets

NEUTRAL LOCK FLAG JUDGMENT

NEUTRAL LOCK FLAG JUDGMENT

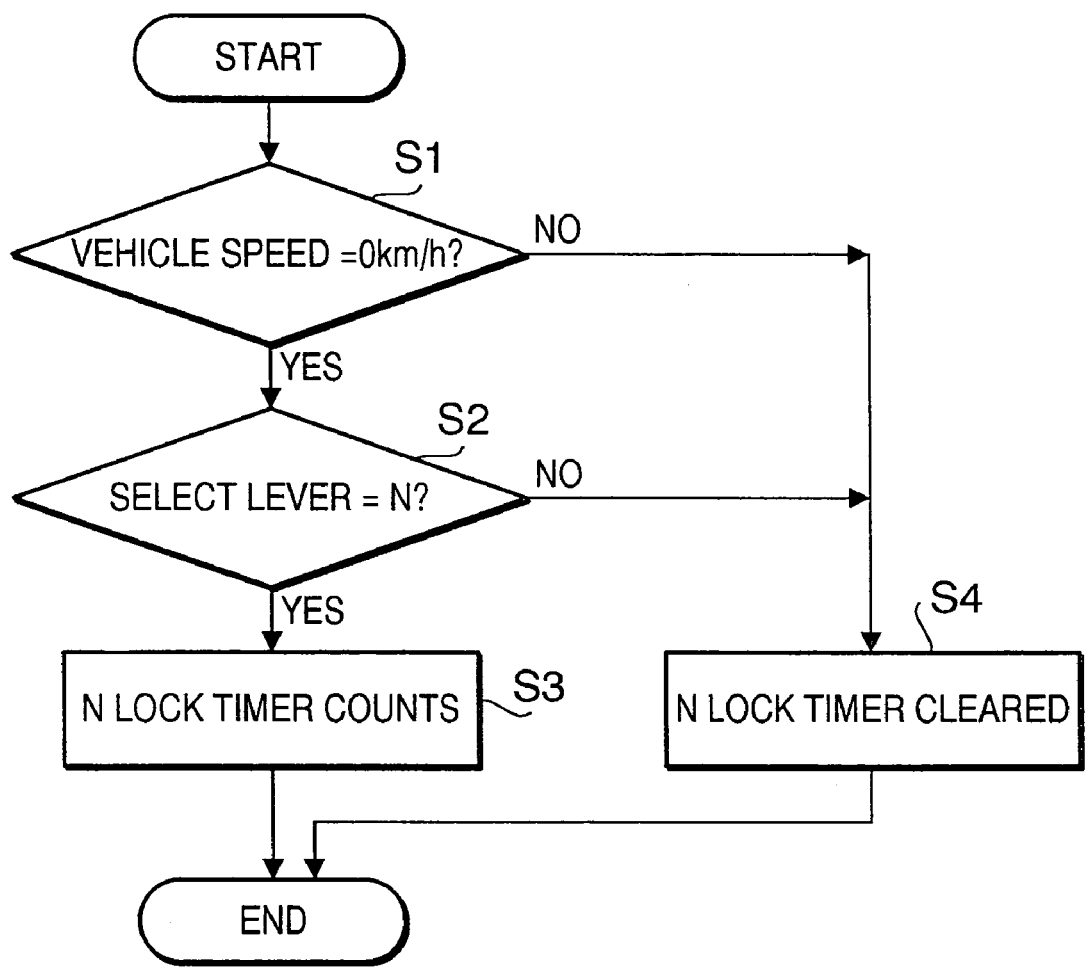

CONTROL SYSTEM FOR TRANSMISSION

CROSS REFERENCE TO RELATED APPLICATION

Applicants hereby claim foreign priority benefits under U.S.C. §119 of Japanese Patent Application No. 2003-304420, filed on Aug. 28, 2003, and the content of which is herein incorporated by reference.

BACKGROUND OF THE INVENTION

1. Field of Invention

This invention relates to a control system for an automotive transmission.

2. Description of the Related Art

An automatic transmission for use in an automobile comprises a transmission disposed between an engine and driving wheels of the car, and a select lever provided in a driver's compartment, and is applied to control changing gear operation of the transmission according to the position of the select lever.

The select lever can be shifted between a neutral position (P (Parking) range, N (Neutral) range) and a running position (D (Drive) range, R (Reverse) range, etc.). When the select lever is shifted to the neutral position, the transmission becomes in a neutral state where power output of the engine is not transmitted to the driving wheels. When the select lever is shifted to the running position, the transmission becomes in a gear-in state (or an engaging state) where driving force of the engine is transmitted to the driving wheels. In the gear-in state, with a so-called creep of the transmission, the vehicle is moved forward when the select lever is in D range, or is moved backward when the select lever is in R range, even if an accelerator is not depressed.

Such type of automatic transmission is known that the select lever cannot be shifted from the neutral position to the running position unless a brake pedal is depressed. Thereby, (1) the driver develops a habit of shifting the select lever after depressing the brake pedal so that mistake in depressing the brake pedal or the accelerator upon sudden movement of the vehicle does not happen, and (2) sudden movement of the vehicle when the select lever is touched by the human body in error and shifted from the neutral position to the running position during the vehicle stopping can be prevented.

Many of these types of automatic transmissions have a mechanism for mechanically locking the select lever into the neutral position to prevent the select lever to be shifted from the neutral position to the running position without depression of the brake pedal. Alternatively, so-called shift-by-wire type automatic transmission is known in which the creep can be generated. In this, the select lever can be shifted from the neutral position to the running position even if the brake pedal is not depressed; however, the gear-in operation of the transmission is not done by an electrical control restriction (refer to Japanese Patent Publication No. 4-77825).

Meanwhile, the conventional automatic transmission cannot change its state from the neutral state to the gear-in state unless the brake pedal is depressed. Therefore, when the vehicle sticks into a hollow on the road with a low coefficient of friction such as a sand road, a gravel road or a mud road, it is very difficult to perform a shaking operation by which the vehicle is shaken forward and backward to escape from the hollow.

More specifically, in order to escape from the sticking state, it is effective to suddenly generate a driving force that oppositely alternates its direction to change a moving direction of the vehicle from forward to backward and vice versa by turns to shake the vehicle forward and backward. However, in order to change the moving direction of the vehicle, it is required to change by turns the position of the select lever from the N range as the neutral position to the D range or the R range as the running position. In the conventional automatic transmission, the brake pedal must be depressed whenever the select lever is shifted from the N range to the D range or the R range which are located in both sides of the N range. Therefore it has been difficult to perform a quick change of the direction of the driving force.

SUMMARY OF THE INVENTION

It is an object of this invention to provide a control system for a transmission by which quick change of direction of driving force can be performed.

In order to attain the above-mentioned object, this invention provides a control system for a transmission comprising a select lever operable to shift from a neutral position to a running position and vice versa, and a control part to control a changing gear operation of the transmission in accordance with the position of the select lever, wherein the control part comprises changing gear limitation means, and when the select lever is shifted from the neutral position to the running position, the changing gear limitation means permits a gear-in operation of the transmission if a stationary time during when the select lever is in the neutral position is equal to or less than a predetermined time, and holds the transmission in the neutral state if the stationary time exceeds the predetermined time.

The changing gear limitation means may comprise a position sensor to be turned ON when the select lever is in the neutral position and to be turned OFF when the select lever is out of the neutral position, a diner to measure time during which the sensor is ON, and an N (Neutral) lock part to permit the gear-in operation of the transmission if the time measured is equal to or less than the predetermined time, and to hold the transmission in the neutral state if the time measured exceeds the predetermined time.

The changing gear limitation means may comprise a brake sensor to detect a depression of a brake pedal, and limitation releasing means to permit the gear-in operation of the transmission when the brake sensor detects the depression of the brake pedal even if the stationary time exceeds the predetermined time.

The changing gear limitation means may comprise a warning buzzer and/or a warning lamp to work to tell the driver of the ineffectiveness of the shifting operation of the select lever when the transmission is held in the neutral state although the select lever is shifted from the neutral position to the running position.

The transmission may be an automatic transmission.

The transmission may comprise a torque converter.

An arrangement of the neutral position and the running position may be such that an N range as the neutral position is interposed between a D range as the running position and an R range as the running position.

BRIEF DESCRIPTION OF THE DRAWINGS

FIG. 4 is a flow chart relating to an N lock timer.

DESCRIPTION OF THE PREFERRED EMBODIMENTS

Preferred embodiments of this invention will now be described with reference to the accompanying drawings.

Figure 1:
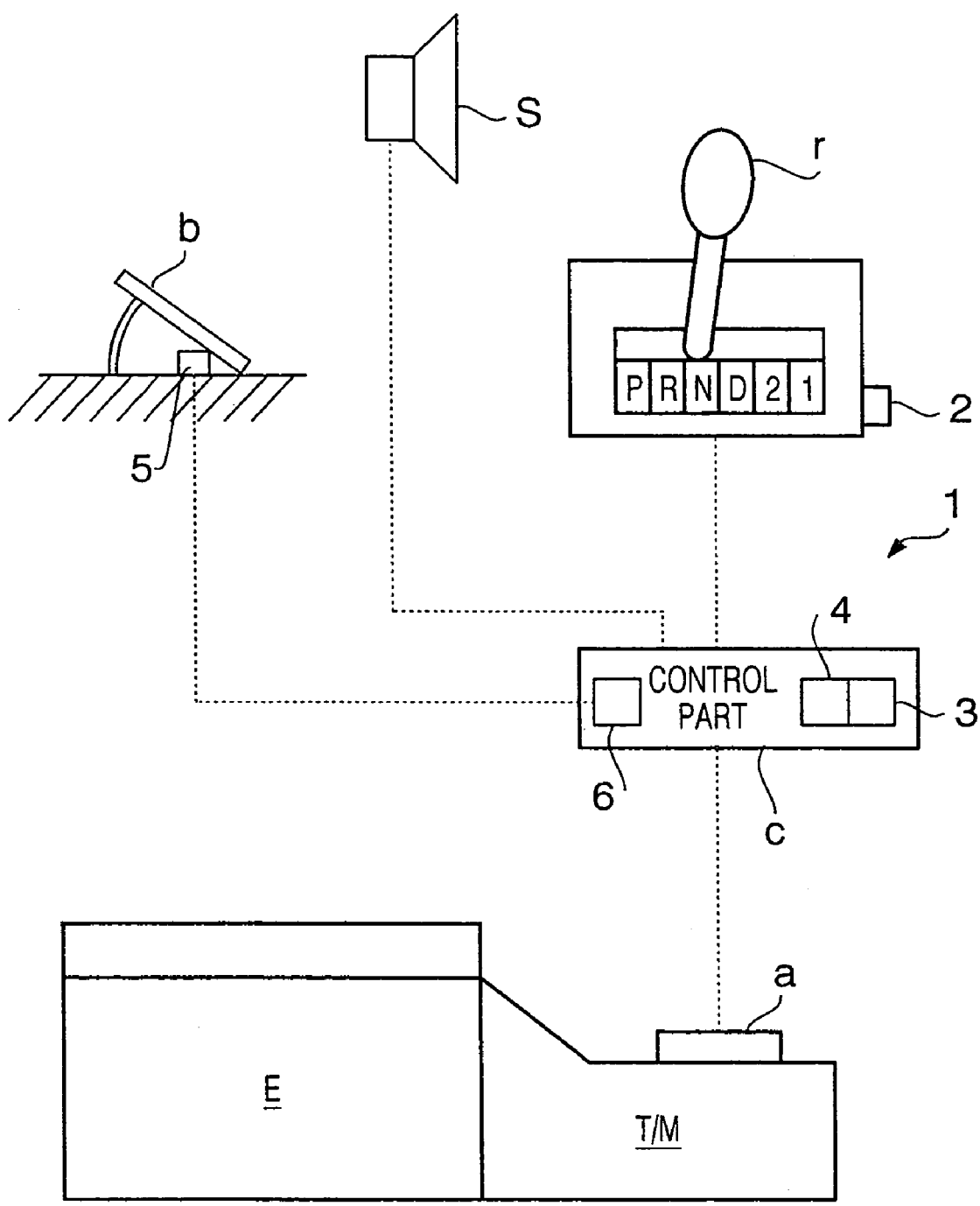
FIG. 1 is a schematic diagram of a control system for a transmission concerning a preferred embodiment of this invention.

As shown in FIG. 1, a transmission T/M is coupled to an engine E of a car. The transmission T/M governs the speed of the engine E, and transmits it to driving wheels (not shown). A gear shift actuator a is provided in the transmission T/M for performing a changing gear operation thereof. A control part c which includes an ECU (electronic control unit) and is electrically connected to the actuator a. A select lever (a changing speed lever) r provided in a driver's compartment is electrically connected to the control part c.

The select lever r is operable to move between a neutral position (P range, N range) and a running position (D range, R range, 2 (2nd) range, 1 (1st) range, etc.). Each of these ranges is an example. It is necessary that the select lever r can be shifted into the N range, the D range, or the R range. However, the 2 range and the 1 range are optional.

When the select lever r is shifted into the neutral position (P range, N range), the control part c provides the actuator a with a command to make the transmission T/M a neutral state. Thereby, the transmission T/M becomes in the neutral state, and the driving force of the engine E is not transmitted to the driving wheels. Thus, the vehicle is not moved either forward or backward.

When the select lever r is shifted into the running position (D range, R range, 2 range, 1 range), the control part c provides the actuator a with a command to engage the gears of the transmission T/M and to automatically change the gear of the transmission T/M in accordance with a predetermined program. Thereby, the transmission T/M enters the gear-in state, and the vehicle is moved forward by a creep when the select lever r is in the D range, the 2 range or the 1 range, or is moved backward by the creep when the select lever r is in the R range.

In order to generate the creep, a torque converter is provided between an output shaft of the engine E and an input shaft of the transmission T/M. It is preferable that the torque converter has a so-called lock-up clutch.

The control part c comprises changing gear limitation means 1. When the select lever is shifted from the neutral position to the running position, the means 1 permits a gear-in operation of the transmission T/M if a stationary time T during which the select lever r is in the neutral position before shifted into the running position is equal to or less than a predetermined time, while the means 1 holds the transmission T/M in the neutral state If the stationary time T exceeds the predetermined time.

The changing gear limitation means 1 comprises a position sensor 2 to be turned ON when the select lever r is shifted into the neutral position and to be turned OFF when the select lever r is shifted out of the neutral position, a timer 3 to measure the time T during which the sensor 2 is ON, and an N lock part 4 to permit the gear-in operation of the transmission T/M if the time T is equal to or less than a predetermined time, while holding the transmission T/M in the neutral state if the time T exceeds the predetermined time. The position sensor 2 is provided near the select lever r, and the timer 3 and the N lock part 4 are provided in the control part c.

The changing gear limitation means 1 further comprises a warning buzzer s and/or a warning lamp (not shown) which work to tell the driver an ineffectiveness of the shifting operation of the select lever r, if the stationary time T exceeds the predetermined time and the transmission T/M is held in the neutral state although the select lever is shifted from the neutral position to the running position. The warning buzzer s and/or the warning lamp are provided in the driver's compartment.

The changing gear limitation means 1 further comprises a brake sensor 5 to detect a depression of the brake pedal b, and limitation releasing means to permit the gear-in operation of the transmission T/M when the sensor 5 detects the depression of the brake pedal b even if the stationary time T exceeds the predetermined time. The brake sensor 5 is provided near the brake pedal b or in the middle of a hydraulic pipe for a brake, and the limitation releasing means 6 is provided in the control part c.

A control performed by the changing gear limitation means 1 will now be described with reference to FIGS. 2 to 4.

FIG. 4 is a flow chart of control for starting or clearing the timer 3 (N lock timer) which is applied for counting the stationary time T during which the select lever r is in the neutral position.

Firstly, it is judged in step S1 as to whether a vehicle speed is 0 km/h, that is, the vehicle is stopping. The vehicle speed is detected by a general vehicle speed sensor. If a result of the judgment is YES, that is, the vehicle is stopping, then the control goes to step S2 in which it is judged as to whether the select lever r is in the neutral position (N range, P range). If a result of the judgment is YES, that is, the select lever r is in the neutral position, then the control proceeds to step S3 where the count by the timer 3 is started.

On the other hand, if a result of the judgment in step S1 is NO, that is, the vehicle is moving, then the control goes to step S4 in which the timer 3 is cleared (reset). If a result of the judgment in step S2 is NO, that is, the select lever r is in a position other than the neutral position, namely in the running position (D range, R range, 2 range, 1 range), then the control proceeds to step S4 to clear the timer 3.

Thus, the timer 3 starts the count if the vehicle is stopping and the select lever r is in the neutral position, and it measures the stationary time T during when the select lever r is in the neutral position, and it is cleared if the vehicle moves or the select lever r is moved to the running position.

Figure 3:
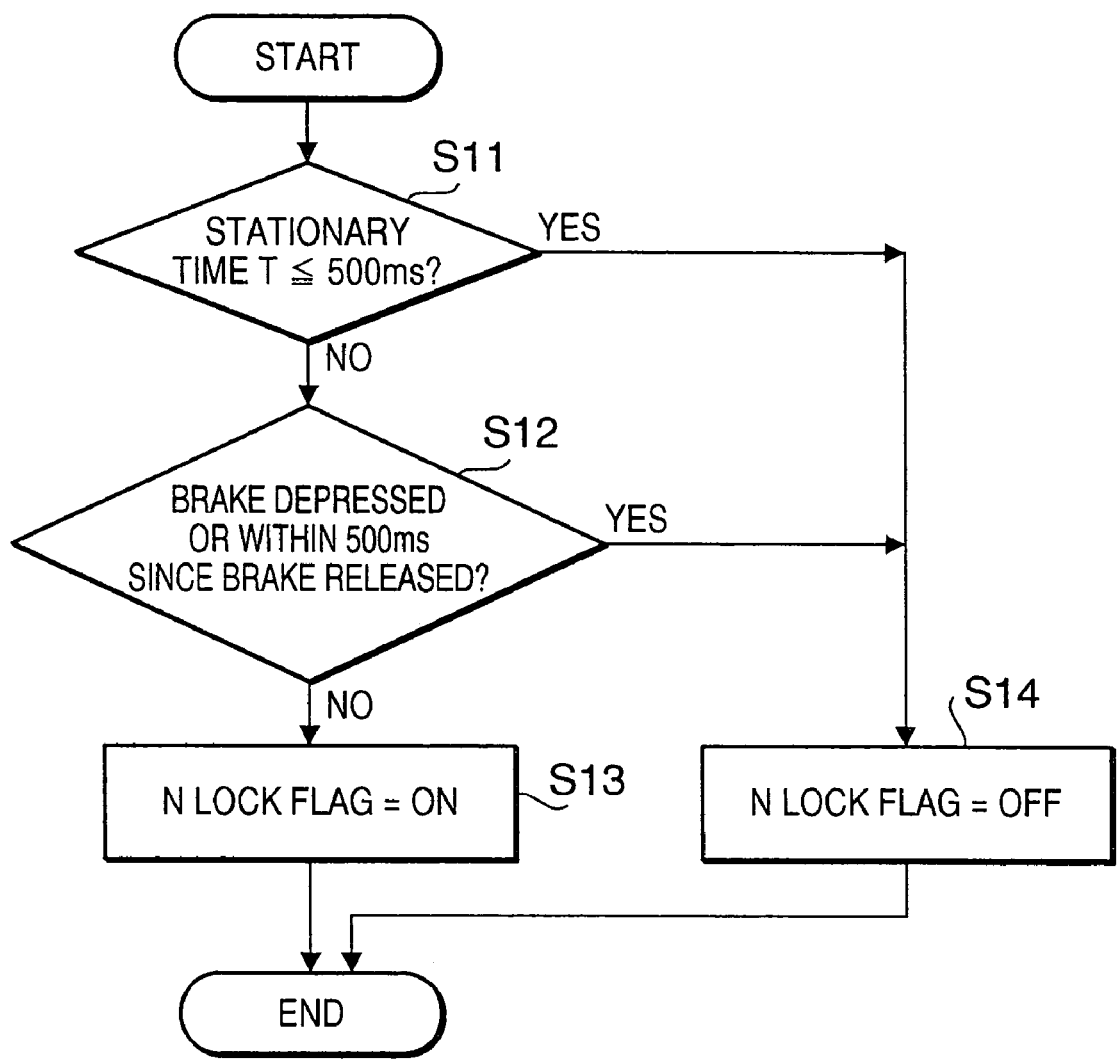
FIG. 3 is a flow chart relating to an N lock flag.

FIG. 3 is a flow chart of control in which the stationary time T measured by the timer 3 is compared with the predetermined time (500 ms in this example) and it is determined as to whether an N lock flag should be ON or OFF.

As is understood after, if the N lock flag is ON, the transmission T/M is maintained in the neutral state even if the driver moves the select lever r from the neutral position to the running position. On the contrary, if the N lock flag is OFF, the gear-in operation of the transmission T/M is performed when the driver moves the select lever r from the neutral position to the running position.

Referring to FIG. 3, in an initial step S11, it is judged as to whether the stationary time T measured by the timer 3 is equal to or less than the predetermined time (500 ms). If the result is NO, that is, the stationary time T is more than 500 ms, then the control goes to step S12.

In step S12, it is judged as to whether the brake pedal b is depressed (namely, the brake sensor 5 is ON), or, the present is within 500 ms since the brake pedal b was released (namely, since the brake sensor 5 was turned OFF from ON). This time is measured by using the above-mentioned timer 3 or another timer. If the result of the judgment in step S12 is NO, that is, the brake pedal b is not depressed at the present or the present is without 500 ms since the brake pedal b was released, then the control goes to step S13 where the N lock flag is turned ON.

On the other hand, if the result of the judgment in step S11 is YES, that is, the stationary time T is within 500 ms, then the control goes to step S14 where the N lock flag is turned OFF. And also, the result of the judgment in step S12 is YES, that is, the brake pedal b is depressed at the present or the present is within 500 ms since the brake pedal b was released, then the control goes to step S14 where the N lock flag is turned OFF.

In short, the N lock flag is turned OFF in the case that; (1) the stationary time T during which the select lever r is in the neutral position which is measured by the timer 3 is equal to or less than 500 ms (the result is YES in step S11); (2) the brake pedal is depressed at the present even if the stationary time T exceeds 500 ms (the result is YES in step S12); or (3) the present is within 500 ms since the brake pedal b was released even if the stationary time T exceeds 500 ms (the result is YES in step S12).

On the contrary, the N lock flag is turned ON in the case that: (1) the stationary time T during which the select lever r is in the neutral position which is measured by the timer 3 is more than 500 ms (the result is NO in step S11), and the brake pedal is not depressed at the present (the result is NO in step S12), or (2) the stationary time T is more than 500 ms (the result is NO in step S11), and the present is without 500 ms since the brake pedal b was released (the result is NO in step S12).

Figure 2:
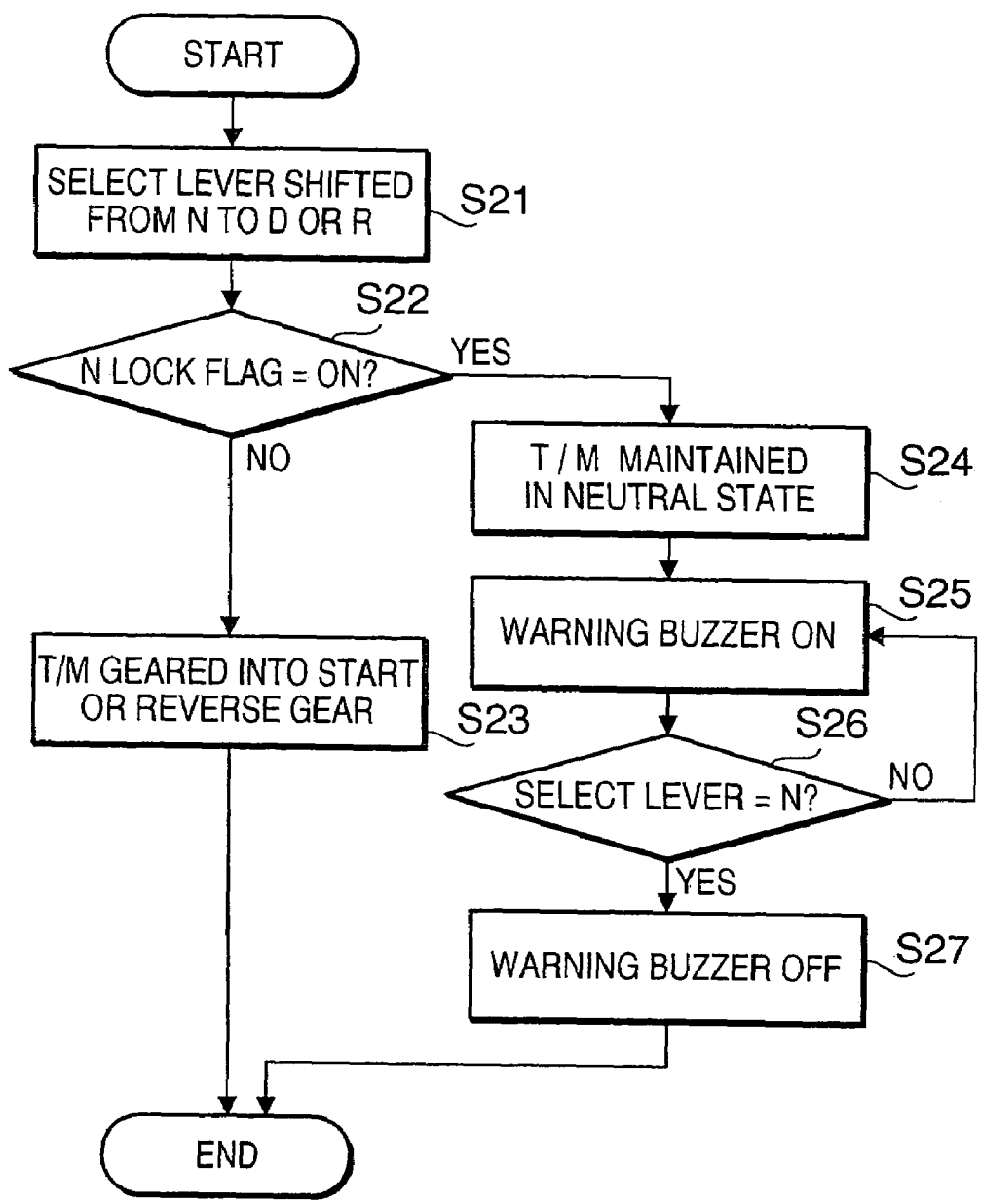
FIG. 2 is a flow chart relating to changing gear limitation means.

FIG. 2 is a flow chart of control by which the transmission T/M is controlled to shift into the gear-in state or the neutral state according to ON or OFF of the N lock flag. This control is performed on the basis of the command from the control part c to the actuator a shown in FIG. 1.

Firstly, the control is started when the select lever r is shifted from the neutral position (N range, P range) to the running position (D range, R range, 2 range, 1 range) as shown in step S21. This shifting operation of the select lever r is detected by the position sensor 2. In many cases of escaping from the sticking, the select lever is shifted by turns from the N range to the D range or the R range which are located in both sides of the N range.

After the shifting operation of step S21, the control goes to step S22 where it is judged as to whether the N lock flag is ON. If the result is NO in step S22, namely the N lock flag is OFF, then the control proceeds to step S23 in which the transmission T/M is geared into a start gear (e.g. a 1st gear) or a reverse gear according to the range position of the select lever r which was moved from the neutral position to the running position (D range, R range, etc.). Consequently, the vehicle moves forward or backward, in response to the accelerator depression, or by the creep unless the accelerator is depressed.

On the other hand, if the result is YES in step S22, namely the N lock flag is ON, then the control proceeds to step S24 in which the transmission T/M is maintained in the neutral state although the select lever r was shifted from the neutral position to the running position. And then, in next step S25, the warning buzzer s is turned ON to tell the driver that the shifting operation of the select lever r is ineffective. In next step S26, it is judged whether the select lever r is returned to the neutral position. If the result is YES, then the control goes to step S27 where the warning buzzer s is turned OFF. If the result is NO, the control returns to step S25 by which the warning buzzer s is kept ON until the select lever r is returned to the neutral position.

As described above, in the control system 1 for the automatic transmission concerning this embodiment, it is a requisite for implementation of the control that the select lever r is shifted from the neutral position (N range or P range) to the running position (D range, R range, 2 range, 1 range) when the vehicle stops (step S21).

When the select lever r is shifted from the neutral position to the running position during the vehicle stopping, the N lock flag is turned ON (step S13) if the stationary time T during which the select lever r is in the neutral position before shifted to the running position is more than the predetermined time (500 ms in this example) (the result is NO in step S11) and the brake pedal is not depressed when the select lever is shifted (the result is NO in step S12). Therefore, in this case, the transmission T/M is maintained in the neutral state although the select lever r is shifted to the running position from the neutral position.

Accordingly, the driving force of the engine E is not transmitted to the driving wheels. As a result of this, when the select lever is shifted from the neutral position to the running position during the vehicle stopping due to, for example, the human body touching the select lever in error, sudden movement of the vehicle can be prevented, and the sudden creep start of the vehicle due to, for example, a wrong operation of the select lever r can be prevented. In this case, the warning buzzer s beeps to tell the driver that the select lever r is in the running position under an ineffective condition of the shifting operation.

On the other hand, when the select lever r is shifted from the neutral position to the running position during the vehicle stopping, the N lock flag is turned OFF (step S14) if the stationary time T during when the select lever r is in the neutral position before shifted to the running position is more than the predetermined time (500 ms in this example) (the result is NO in step S11) but the brake pedal is depressed when the select lever is shifted to the running position (the result is YES in step S12). Therefore, when the select lever r is moved to the running position from the neutral position, the gear-in operation of the transmission T/M in accordance with the range position of the running position of the select lever r is permitted.

Thus, when the driver operates the select lever r from the neutral position to the running position, the gear-in of the transmission T/M is not carried out unless the driver depresses the brake pedal. And also, if the driver shifts the select lever r from the neutral position to the running position not depressing the brake pedal, the warning buzzer works to tell the ineffectiveness of the shift operation of the select lever r. Thereby, the driver can be made with a habit of operating the select lever r after depressing the brake pedal b. Moreover, sudden movement of the vehicle due to mistake in depressing the brake pedal or the accelerator can be prevented, because the gear-in is not performed unless the brake pedal b is depressed.

Moreover, when the select lever r is shifted from the neutral position to the running position during the vehicle stopping, the gear-in of the transmission T/M is permitted if (1) the stationary time T exceeds the predetermined time (500 ms) (the result is NO in step S11), but (2) the brake pedal b is depressed and released before the above shifting operation of the select lever, and the period from the time of releasing the brake pedal to the time of starting the above shifting operation of the select lever is equal to or less than another predetermined time (500 ms in this example)(the result is YES in step S12), because thereby the N lock flag is turned OFF (step S14).

Thus, the gear-in of the transmission T/M is performed if the driver shifts the select lever r from the neutral position to the running position immediately after releasing the brake pedal b from its depressed state (within 500 ms from the releasing), even in the case that the driver does not depress the brake pedal b when shifting the select lever r from the neutral position to the running position. For this reason, the gear-in is performed also in the case that the driver depresses the brake pedal b and then releases it just before operating the select lever r from the neutral position to the running position. Therefore, convenience of the operation at the vehicle starting increases.

Next, a quick change of the direction of the driving force will now be described as one of features of this embodiment. This change is caused by alternate shifting operation of the select lever r between N range of the neutral position and D range or R range of the running position.

In this embodiment, when the select lever r is shifted from the neutral position to the running position during the vehicle stopping, the N lock flag is turned OFF (step S14) if the stationary time T during when the select lever r is in the neutral position before shifted to the running position is equal to or less than the predetermined time (500 ms in this example) (the result is YES in step S11), even in the case that the brake pedal b is not depressed.

Therefore, in such a case, when the select lever r is moved to the running position (D range, R range) from the neutral position (N range), the gear-in operation in the transmission T/M is performed according to the range position of the running position of the select lever r. And then, the driving force of the engine E is transmitted to the driving wheel.

Normally, when the driver quickly shifts the select lever r from N range of the neutral position to D range or R range of the running position and vice versa, the stationary time T during when the select lever r is in the neutral position is within 500 ms. Therefore, the direction of the driving force for the driving wheel can be quickly changed forward and backward without depression of the brake pedal b, and the shaking operation for escaping from sticking becomes possible.

More specifically, when the vehicle sticks into the hollow on the road with a low coefficient of friction such as a sand road, a gravel road or a mud road, the driver shifts the select lever r from N range of the neutral position to D range or R range of the running position by turns in order to perform the shaking operation by which the moving direction of the vehicle is quickly changed to forward and backward.

In this shaking operation, if the driver shifts the select lever r to D range or R range through N range at the time of a middle part of the amplitude of the shaking vibration of the vehicle, the gear-in into the forward gear or the backward gear is made approximately just at the timing of peak or bottom of the amplitude at which the vehicle speed is zero. Therefore, the direction of the driving force is reversed at the peak or the bottom of the amplitude of the shaking vibration, and the escaping from sticking can be effectively made.

That is, if the above-described shifting operation of the select lever r is performed, the N lock flag is turned OFF when the select lever r is momentarily in N range at the peak or the bottom of the amplitude of the shaking vibration, because the vehicle speed momentarily (equal to or less than 500 ms) becomes zero. Therefore, when the select lever r is shifted from N range to D range or R range, the gear-in in the transmission T/M is made in accordance with each range. Thereby, an escape from the sticking can be done.

As is described above, according to this embodiment if the stationary time during which the select lever r is in the neutral position (which is N range in this embodiment but can include P range) is more than the predetermined time (500 ms in this embodiment), the transmission T/M is held in the neutral state although the select lever r is shifted to the running position, so that sudden movement of the vehicle caused by the wrong operation is prevented. And also, if the stationary time during which the select lever r is in the neutral position is the predetermined time or less, the gear-in operation of the transmission T/M responding to the shifting operation of the select lever is allowed, so that the quick change or reverse of the direction of the driving force is attained.

The embodiment of this invention is not limited to the above-mentioned embodiment.

The predetermined time in step S11 is not limited to 500 ms but may be more than or less than 500 ms. Another predetermined time in step S12 is not limited to 500 ms but may be more than or less than 500 ms. These times may differ from each other.

The transmission may not be the automatic transmission, but may be the manual transmission of the type of clutch pedal-less. This manual transmission may be such that the changing gear operation is made by the driver who moves the gear shift lever as a select lever to each gear position such as a 1st gear position, a second gear position, or a reverse gear position.

The transmission may be the type which comprises a conventional clutch plate instead of a torque converter, and in which a half clutch control for the clutch plate is made by the computer to allow the vehicle to start.

What is claimed is:

1. A control system for a transmission comprising:
   a select lever operable to shift from a neutral position to a running position and vice versa; and
   a control part to control a changing gear operation of the transmission in accordance with the position of the select lever;
   wherein the control part comprises changing gear limitation means, and when the select lever is shifted from the neutral position to the running position, the changing gear limitation means permits a gear-in operation of the transmission if a stationary time during which the select lever is in the neutral position is equal to or less than a predetermined time, and holds the transmission in the neutral state if the stationary time exceeds the predetermined time; and
   wherein the changing gear limitation means permits the gear-in operation of the transmission if a time since a brake pedal was released is equal to or less than another pre-determined time, even if the stationary time exceeds the predetermined time.

2. The control system as defined in claim 1, wherein the changing gear limitation means comprises a position sensor to be turned ON when the select lever is in the neutral position and to be turned OFF when the select lever is out of the neutral position, a timer to measure time during which the sensor is ON, and an N lock part to permit the gear-in operation of the transmission if the time measured is equal to or less than the predetermined time, and to hold the transmission in the neutral state if the time measured exceeds the predetermined time.

3. The control system as defined in claim 2, wherein the changing gear limitation means comprises a brake sensor to detect a depression of the brake pedal, and limitation releasing means to permit the gear-in operation of the transmission when the brake sensor detects the depression of the brake pedal even if the stationary time exceeds the predetermined time.

4. The control system as defined in claim 3, wherein the changing gear limitation means comprises a warning buzzer and/or a warning lamp to work to tell the driver of the ineffectiveness of the shifting operation of the select lever when the transmission is held in the neutral state although the select lever is shifted from the neutral position to the running position.

5. The control system as defined in claim 2, wherein the changing gear limitation means comprises a warning buzzer and/or a warning lamp to work to tell the driver of the ineffectiveness of the shifting operation of the select lever when the transmission is held in the neutral state although the select lever is shifted from the neutral position to the running position.

6. The control system as defined in claim 1, wherein the changing gear limitation means comprises a brake sensor to detect a depression of the brake pedal, and-limitation releasing means to permit the gear-in operation of the transmission when the brake sensor detects the depression of the brake pedal even if the stationary time exceeds the predetermined time.

7. The control system as defined in claim 6, wherein the changing gear limitation means comprises a warning buzzer and/or a warning lamp to work to tell the driver of the ineffectiveness of the shifting operation of the select lever when the transmission is held in the neutral state although the select lever is shifted from the neutral position to the running position.

8. The control system as defined in claim 6, wherein the transmission is an automatic transmission.

9. The control system as defined in claim 8, wherein the transmission comprises a torque converter.

10. The control system as defined in claim 6, wherein the transmission comprises a torque converter.

11. The control system as defined in claim 6, wherein an arrangement of the neutral position and the running position is such that an N range as the neutral position is interposed between a D range as the running position and an R range as the running position.

12. The control system as defined in claim 1, wherein the changing gear limitation means comprises a warning buzzer and/or a warning lamp to work to tell the driver of the ineffectiveness of the shifting operation of the select lever when the transmission is held in the neutral state although the select lever is shifted from the neutral position to the running position.

13. The control system as defined in claim 12, wherein the transmission is an automatic transmission.

14. The control system as defined in claim 13, wherein the transmission comprises a torque converter.

15. The control system as defined in claim 12, wherein the transmission comprises a torque converter.

16. The control system as defined in claim 12, wherein an arrangement of the neutral position and the running position is such that an N range as the neutral position is interposed between a D range as the running position and an R range as the running position.

17. The control system as defined in claim 1, wherein the transmission is an automatic transmission.

18. The control system as defined in claim 1, wherein the transmission comprises a torque converter.

19. The control system as defined in claim 1, wherein an arrangement of the neutral position and the running position is such that an N range as the neutral position is interposed between a D range as the running position and an R range as the running position.

* * * * *

UNITED STATES PATENT AND TRADEMARK OFFICE
CERTIFICATE OF CORRECTION

PATENT NO.        : 7,152,725 B2                                              Page 1 of 1
APPLICATION NO.   : 10/926870
DATED             : December 26, 2006
INVENTOR(S)       : Kazuhito Sebata et al.

It is certified that error appears in the above-identified patent and that said Letters Patent is hereby corrected as shown below:

Column 2, line 36, please delete the word "diner" and replace with --timer--.
Column 3, line 52, please delete the word "If" and replace with --if--.

Signed and Sealed this

Twenty-seventh Day of March, 2007

JON W. DUDAS
*Director of the United States Patent and Trademark Office*